(12) United States Patent
Pockett et al.

(10) Patent No.: US 10,428,528 B1
(45) Date of Patent: Oct. 1, 2019

(54) OVERFLOW DEVICE

(71) Applicant: DAM BUSTER IP PTY LTD., Victoria (AU)

(72) Inventors: David John Pockett, Victoria (AU); Russell John Kirkwood, Victoria (AU)

(73) Assignee: DAM BUSTER IP PTY LTD, South Melbourne (AU)

( * ) Notice: Subject to any disclaimer, the term of this patent is extended or adjusted under 35 U.S.C. 154(b) by 0 days.

(21) Appl. No.: 15/921,790

(22) Filed: Mar. 15, 2018

(51) Int. Cl.
*E04D 13/064* (2006.01)
*E04D 13/08* (2006.01)

(52) U.S. Cl.
CPC .......... *E04D 13/0645* (2013.01); *E04D 13/08* (2013.01); *E04D 2013/0873* (2013.01)

(58) Field of Classification Search
CPC ................ E04D 13/0645; E04D 13/08; E04D 2013/0813; E04D 2013/0873
See application file for complete search history.

(56) References Cited

U.S. PATENT DOCUMENTS

| | | | |
|---|---|---|---|
| 237,469 A * | 2/1881 | Bergennan | E04D 13/08 210/311 |
| 3,889,474 A | 6/1975 | Frangmeier | |
| 4,368,601 A | 1/1983 | Price | |
| 4,386,484 A * | 6/1983 | Van Berne | E03B 3/03 52/16 |
| 4,726,151 A * | 2/1988 | Vitale | E03B 3/02 52/16 |
| 5,114,594 A * | 5/1992 | Rosebrock | E04D 13/08 137/357 |
| 5,533,303 A * | 7/1996 | Harvey | E03B 3/02 52/16 |
| 7,584,577 B2 * | 9/2009 | Esmond | E04D 13/08 210/251 |
| 7,805,890 B2 * | 10/2010 | Esmond | E04D 13/08 210/251 |
| 9,038,320 B1 * | 5/2015 | Deakins | E04D 13/0767 52/12 |
| 9,732,526 B2 * | 8/2017 | Denk | E04D 13/08 |
| 9,739,064 B2 * | 8/2017 | Andoh | E04D 13/0645 |
| 2002/0073630 A1 | 6/2002 | Warns | |
| 2005/0109693 A1 * | 5/2005 | Allard | B01D 35/02 210/446 |
| 2010/0193046 A1 * | 8/2010 | Moroder | E04D 13/08 137/357 |

FOREIGN PATENT DOCUMENTS

| | | | | |
|---|---|---|---|---|
| AU | 2017100991 B4 | 8/2017 | | |
| DE | 9206685 U1 * | 8/1992 | ............... | E03B 3/03 |
| FR | 2912162 A1 * | 8/2008 | ............... | E03B 3/03 |
| GB | 2490381 A * | 10/2012 | ............... | E03B 3/02 |
| NZ | 220081 | 5/1990 | | |

* cited by examiner

Primary Examiner — Adriana Figueroa
(74) Attorney, Agent, or Firm — Paul D. Bianco; Katharine Davis; Fleit Gibbons Gutman Bongini & Bianco PL

(57) ABSTRACT

A rainhead (1) comprising: a tub member (3); an internal receptacle (8) in the tub member (3) having an internal wall (7) forming a weir spaced from an external wall (9) of the tub member (3); an inlet (4) arranged to direct water flowing from a gutter into the internal receptacle (8); and, a chute (11) between the internal wall (7) and the external wall (9), the chute (11) being arranged to receive water overflowing from the internal receptacle (8) to allow it to drain from the chute (11) through a chute outlet (13).

20 Claims, 7 Drawing Sheets

Flow Features in Region of Free Overfall

Definition of sharp-crested weir parameters

OVERFLOW DEVICE

TECHNICAL FIELD

This invention relates to a rainhead construction, particularly a rainhead which has one or more features to facilitate overflow of water outside of a building even if a section of the rainhead becomes blocked. In a particular aspect, the invention provides compliant overflow while maintaining a traditional rainhead aesthetic by means of the external wall of the rainhead which shields a direct line of sight into the end of the box gutter but which does not impinge the potential for the rainhead to discharge overflow water if the rainhead outlet becomes blocked or if the flow of water is beyond the capacity of the stormwater drainage system to cope with.

BACKGROUND ART

Any discussion of documents, devices, acts or knowledge in this specification is included to explain the context of the invention. It should not be taken as an admission that any of the material forms a part of the prior art base or the common general knowledge in the relevant art in the United States of America, or elsewhere, on or before the priority date of the disclosure herein.

Australian/New Zealand Standard ("AS/NZS") 3500.3: 2015 (hereinafter simply referred to as "3500.3") stormwater drainage code (titled *Plumbing and drainage Part 3 Stormwater drainage*) specifies three types of overflow devices for box gutters, namely: (a) a rainhead; (b) a sump/side overflow device; and, (c) a sump/high capacity overflow device.

A rainhead operates in such a manner that an increase in the depth of water flow in a box gutter, operating up to its maximum design hydraulic capacity, is not required when the downpipe becomes blocked and the stormwater is required to overflow a wall forming a weir at the front of the rainhead and discharge to atmosphere. Conversely, types (b) and (c) above do require an increase in the depth of flow in the box gutter when the downpipe is blocked, in order for the device to allow overflow to occur up to the maximum design hydraulic capacity of the box gutter.

This invention relates to the first of the three types of above noted overflow devices, namely (a), and may be an alternative to the rainhead as currently prescribed by 3500.3.

The proposed invention may operate in a similar manner to the currently prescribed rainhead in that, under normal flow conditions up to the design hydraulic capacity of the box gutter, the stormwater discharges into the downpipe connected to the underside of the rainhead, and from there flows in an unimpeded manner to the legal point of discharge for the property via the underground stormwater drains. However, this invention differs significantly from the currently prescribed rainhead in the following manners:

a) This invention is physically similar to the prescribed rainhead, except that it has an additional external 'compartment' at the front of the rainhead, which hides the weir, effectively making this an 'internal', non-visible, weir.

b) When the downpipe is blocked or its flow capacity is exceeded, instead of the stormwater overflowing an 'external', visible weir and discharging directly to the atmosphere as drawn in 3500.3, the stormwater firstly overflows the (now) 'internal', non-visible weir, and then potentially impacts with the 'external tub wall' (outer wall of the additional external compartment), before finally discharging vertically, or near vertically, to atmosphere through the primary overflow outlet at the bottom of the rainhead.

c) This invention has a secondary overflow provision, being an outlet/opening (typically rectangular, but other shapes, such as circular may be used provided they supply the necessary capacity) located within the front face of the device (the external tub wall), which operates in a similar manner to the overflow for a sump/side overflow device. However, it is considered extremely unlikely that this secondary overflow provision would ever be required, since it would require both the downpipe/internal receptacle and the 'primary' overflow provision to both be blocked.

d) This invention is considered to have a significant aesthetic advantage over the currently 3500.3 prescribed rainhead because the additional compartment at the front of the device effectively hides the box gutter and the weir, albeit other than a small portion of which may be visible through the secondary overflow provision. It is therefore considered to be a substantially visually preferable device, which is significantly more likely to be selected by architects, building designers and plumbers and the like, over the currently prescribed rainhead in 3500.3 (which in itself is not even commercially available).

This invention is also considered to have substantial advantages over the prior art because visual inspection from below (typically at ground level), and even by a completely untrained person, can quickly and easily confirm if the primary overflow outlet is blocked or clear. The design of the invention ensures that as long as the primary overflow remains visually clear, the invention will continue to work and protect the building from internal flooding. This is unlike currently available rainheads, all of which require access to the rainhead itself (or above it) for inspection purposes. The invention therefore has substantial Occupational Health and Safety benefits in association with routine maintenance and inspections.

DISCLOSURE OF THE INVENTION

According to one aspect, the invention provides a rainhead comprising: a tub member; an internal receptacle in the tub member having an internal wall forming a weir spaced from an external wall of the tub member; an inlet arranged to direct water flowing from a gutter into the internal receptacle; and, a chute between the internal and external wall, the chute being arranged to receive water overflowing from the internal receptacle to allow it to drain from the chute through a chute outlet.

Preferably, a downpipe outlet is provided to drain water from the internal receptacle. The preferred downpipe outlet may be omitted where there is a need to allow an installer the option of cutting an outlet hole to fit a particular size of downpipe.

Preferably and optionally, a secondary overflow outlet may be arranged in the external wall to receive water overflowing from the internal receptacle and chute to overflow out of the rainhead through the external wall.

Preferably, the top of the internal wall is generally lower than the bottom of the inlet. It is also preferred that it may be sharp edged or rounded.

Preferably, the bottom edge of the preferred secondary overflow outlet may be arranged so that it lies lower than the top of the internal wall. It is also preferred that it may be about 25 mm lower.

Preferably, the internal receptacle during normal flow conditions up to the design flow rate and assuming no blockage should be large enough to receive all water flowing through the inlet from a rain gutter without the receptacle overflowing. Generally speaking, this may be achieved by making the cross-sectional area of the inlet and/or gutter directed into the inlet a multiple of the cubic capacity of the receptacle. Preferably, the capacity of the receptacle may be 5 to 45 times the cross-sectional area of the inlet. For example, if the inlet has a cross-sectional area of 1 cm$^2$, then the receptacle may have a capacity of 5 to 45 cm$^3$. More preferably, the receptacle may have a capacity 15 to 30 times the inlet area.

Preferably, the inlet may have a cross-sectional area 0.5 to 4 times the cross-sectional area of the chute outlet. More preferably, it may be 1 to 3 times.

Preferably, the overflow outlet may have a cross-sectional area 0.1 to 1 times the area of the inlet, more preferably 0.15 to 0.5 times the area of the inlet.

These and other essential or preferred features of the invention will be apparent from the description that now follows.

BRIEF DESCRIPTION OF THE DRAWINGS

In order that the invention may be more clearly understood and put into practical effect there shall now be described in detail preferred constructions of a rainhead made in accordance with the invention. The ensuing description is given by way of non-limitative examples only and is with reference to the accompanying drawings, wherein:

FIG. 2 is an isometric view of the rainhead of FIG. 1 taken side on;

MODES FOR CARRYING OUT THE INVENTION

Figure 1:
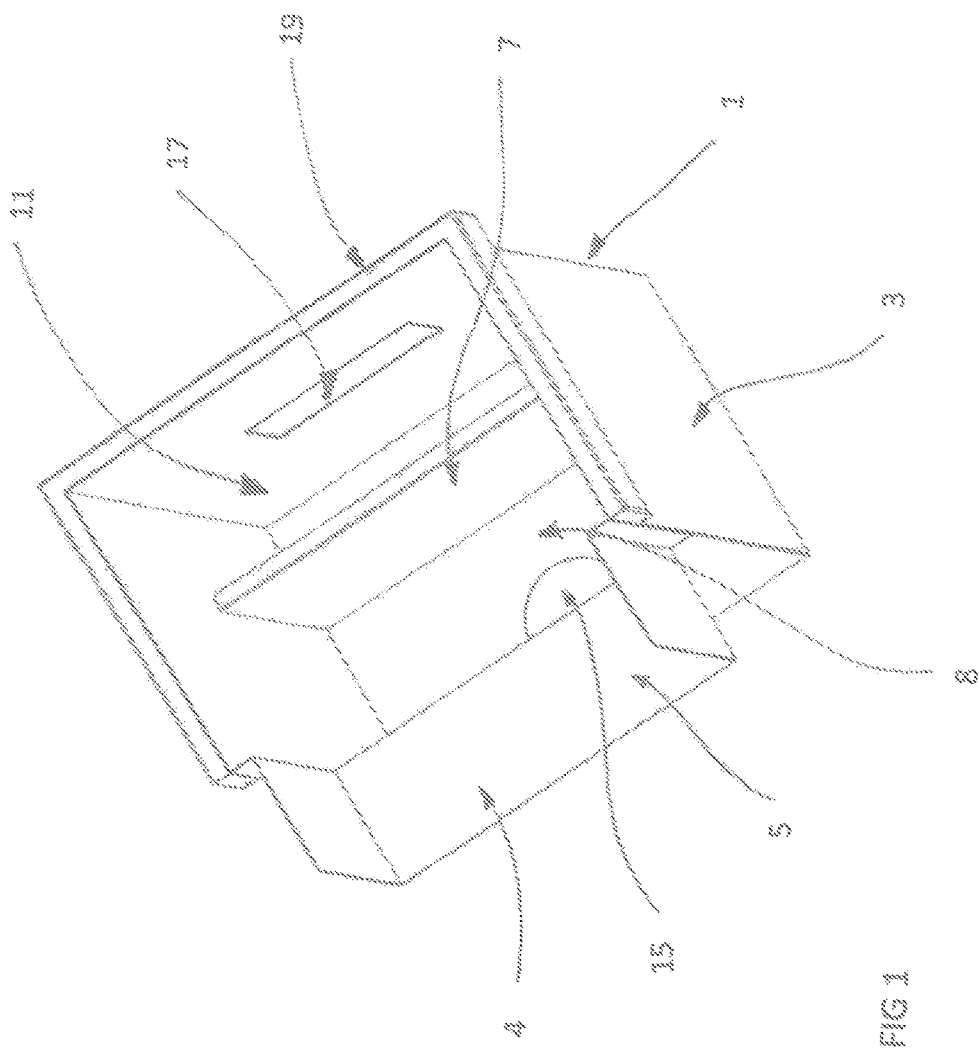
FIG. 1 is an isometric view of a rainhead constructed in accordance with a preferred embodiment of the invention viewed from above.
Figure 2:
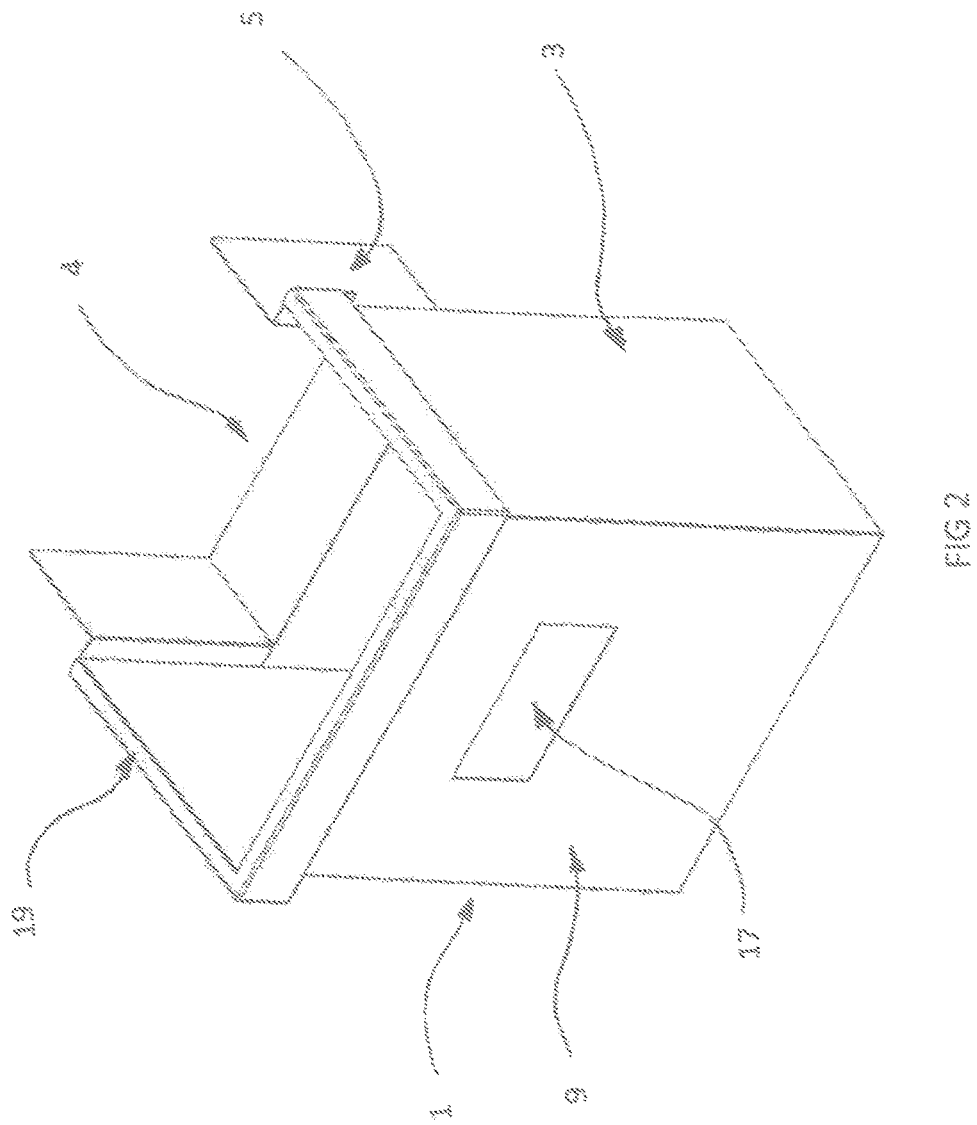
Figure 3:
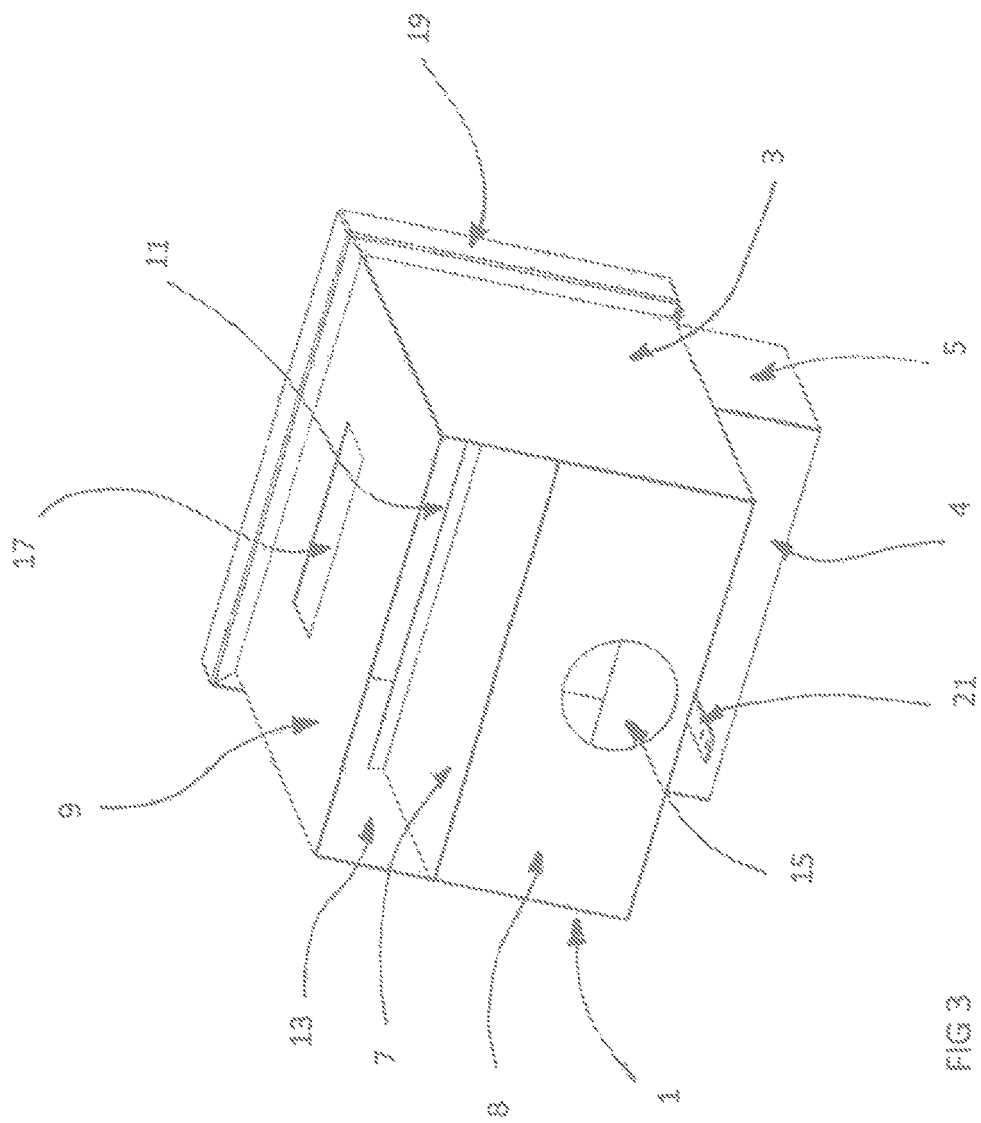
FIG. 3 is an isometric view of the rainhead of FIG. 1 taken from underneath.
Figure 4:
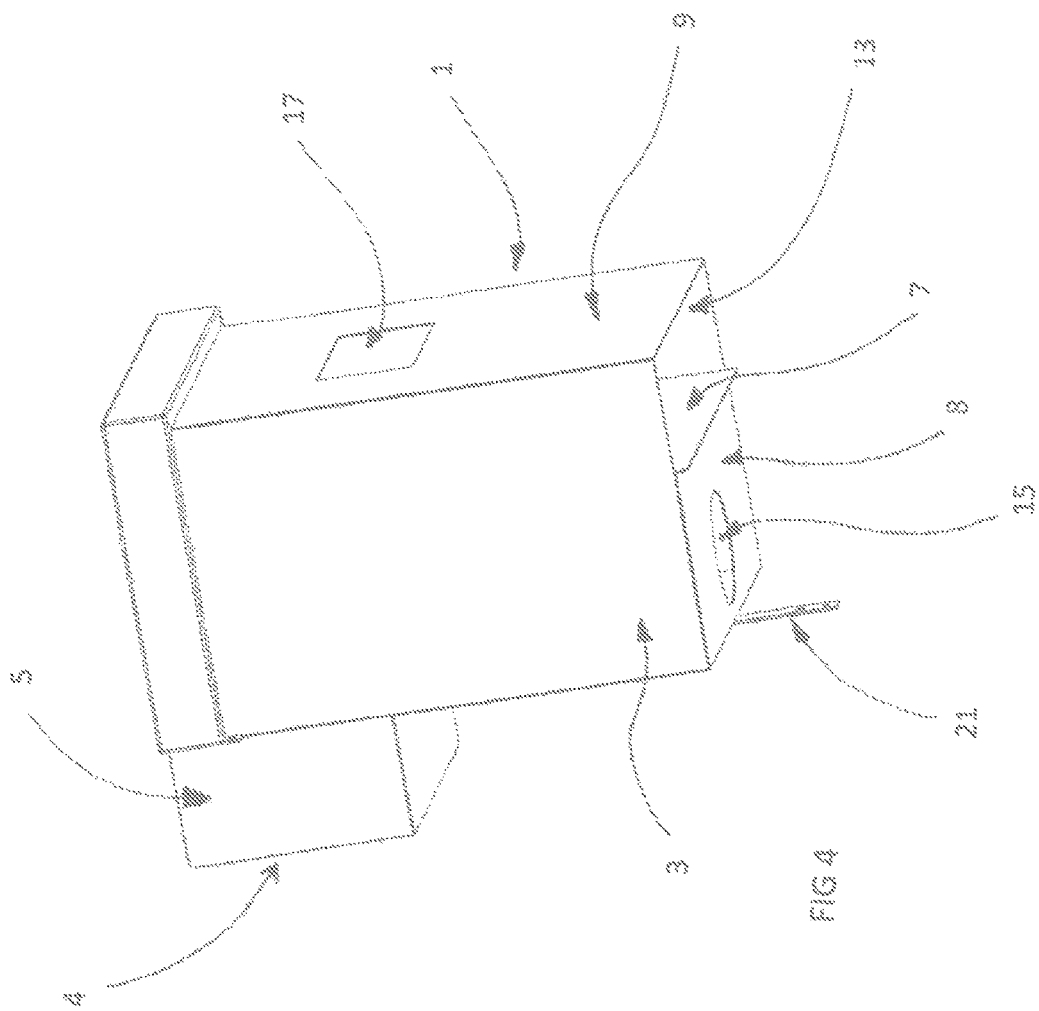
FIG. 4 is an isometric elevational view of the rainhead of FIG. 1.

Referring to FIGS. 1 to 4, there is shown a rainhead generally designated 1, comprising a tub 3 with an inlet 4 shaped to receive the rain guttering (not shown) from the roof (not shown) of a building (not shown).

The inlet includes a gutter receptor 5 shaped so that a channel shaped gutter (not shown) may comfortably and even snugly fit therein.

An internal wall 7 forming an overflow weir is provided in the tub 3. The internal wall 7 divides the tub 3 into an internal receptacle 8 and a chute 11 formed between an external wall 9 and the internal wall 7.

Suitably, the internal wall 7 may be at a level slightly below the level of the bottom edge of the inlet 4.

A chute 11 has a chute outlet 13 which allows water (not shown) to overflow from the rainhead 1 should the internal receptacle 8 become overloaded with water flow or blocked for any reason.

The internal receptacle 8 is provided with a downpipe outlet 15 to which a conventional downpipe (not shown) may be connected. The downpipe outlet 15 may be omitted to allow a user (not shown) to cut out an appropriately sized outlet to accommodate different downpipe dimensions.

As a further precaution, should both the internal receptacle 8 or chute outlet 13 become blocked, such as, by leaves or twigs or foreign objects (not shown), an overflow outlet 17 may be formed in the external wall 9. The overflow outlet 17 may be provided at a level where its bottom edge is below the level of the top of the internal wall 7, but above the calculated impact point of the free overflow from the internal wall 7 forming a weir.

A moulding 19 may be provided around three quarters of the top of the tub 3, both to lend rigidity and to improve the appearance of the rainhead 1.

To facilitate attachment of the rainhead 1 to the side of a building (not shown), an attachment member 21 (as shown, for example, in FIG. 3) may optionally be provided in addition to any fixing lugs or the like (not shown). Also, as can be seen more clearly in FIG. 4, the internal wall 7 may project slightly below the bottom of the internal receptacle 8 to prevent water (not shown) falling through the chute outlet 13 from flowing along the bottom of the internal receptacle 8 onto a wall (not shown) of a building (not shown).

Figure 5:
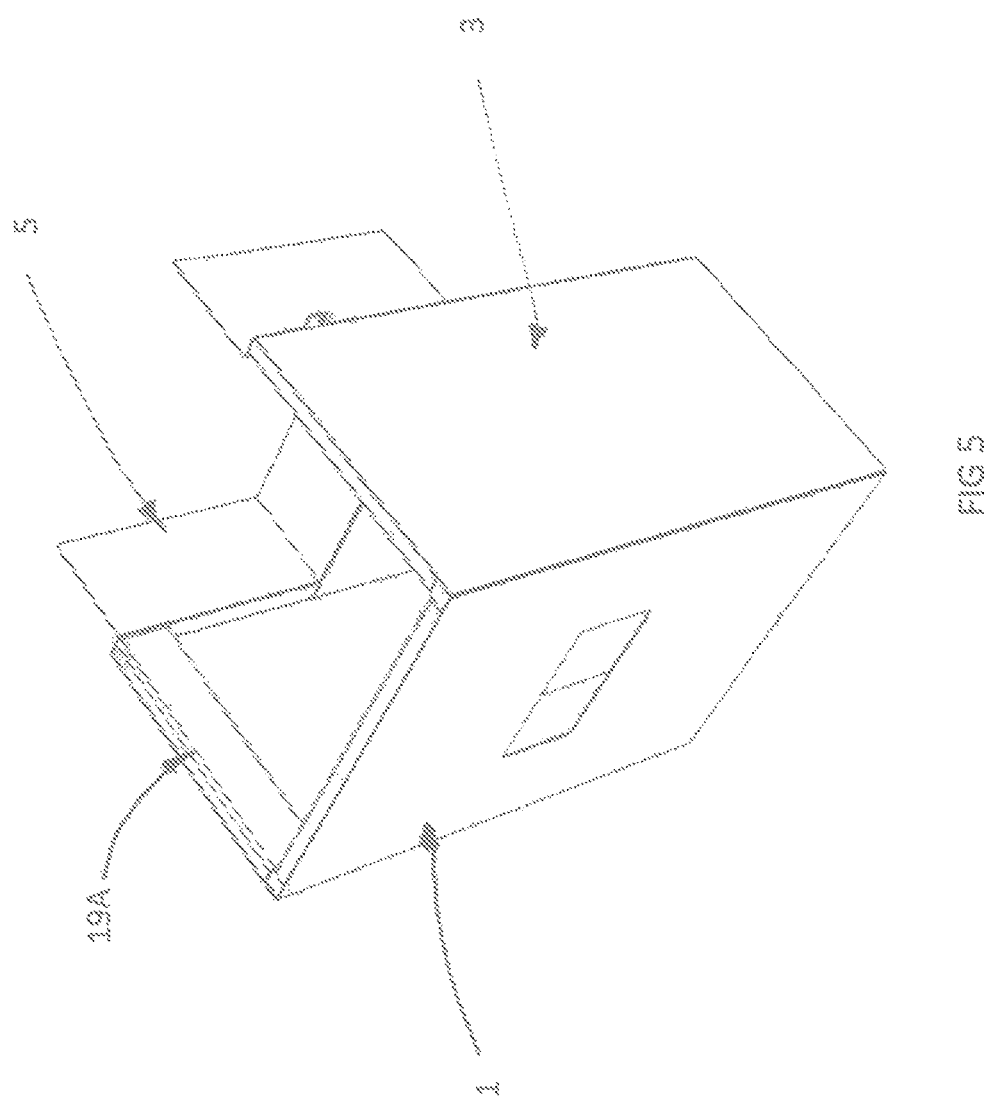
FIGS. 5 and 6 are isometric views of an alternative rainhead construction made in accordance with a further preferred embodiment of the invention.
Figure 6:
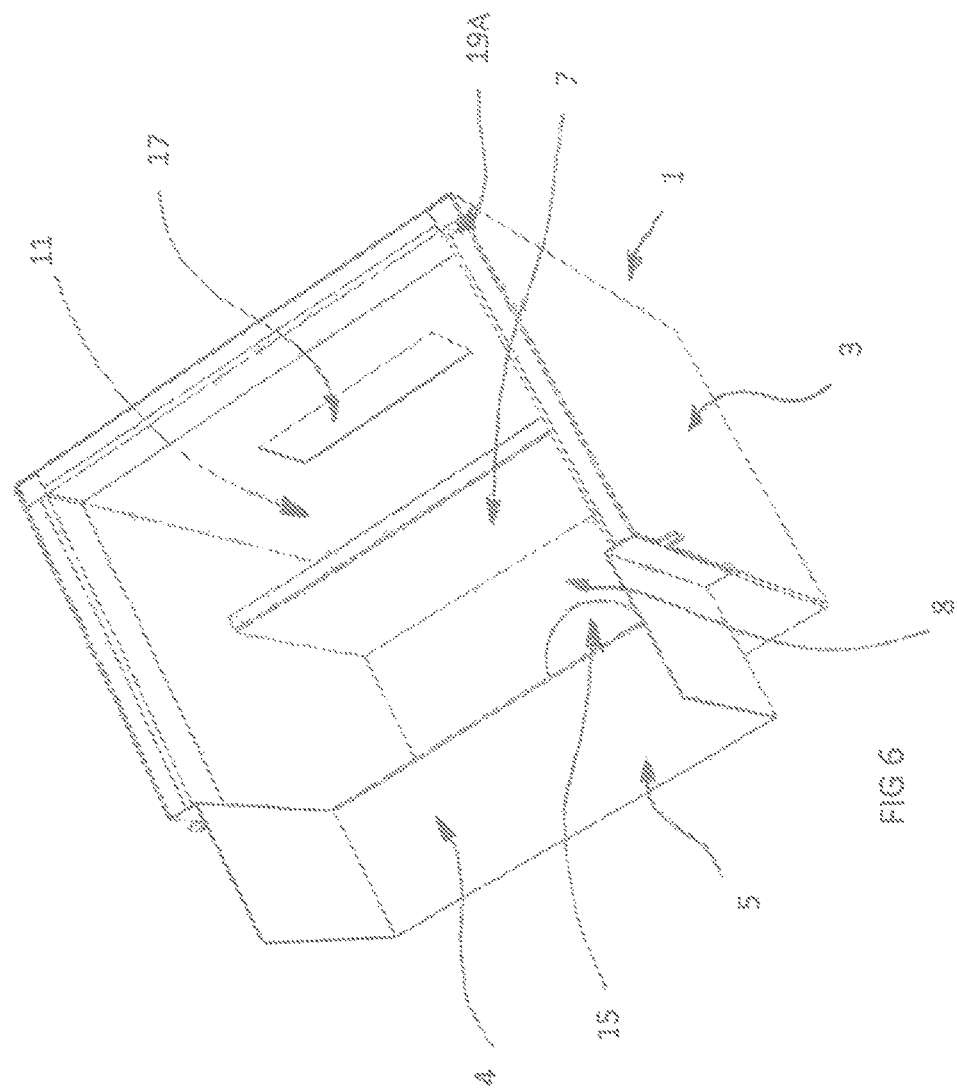

An alternative construction of a rainhead 1 made in accordance with the invention is shown in FIGS. 5 and 6. The alternative rainhead 1 is generally the same as that for FIGS. 1 to 4, with the exception that a moulding 19A is provided internally of the tub 3.

The rainheads 1 of FIGS. 1 to 6, may be constructed of any suitable material, such as, for example, metal, stainless steel, COLORBOND®, Zincalume Steel®, plastic, aluminium, or copper, etc.

Whilst the illustrated embodiments show box-shaped forms of rainheads 1, it is to be appreciated that the walls may be curved or bent in any configuration to suit practical needs or aesthetic requirements provided the main features of the invention are present. Thus, the actual shape of the rainheads 1 may be box-shaped or may have a different appearance which does not necessarily affect the functionality of the rainheads 1.

The relative dimensions of key features of the rainheads 1 described with reference to FIGS. 1 to 6 of the drawings will preferably be according to those previously defined under the heading "Disclosure of the Invention". Generally speaking, these dimensions can be chosen to comply with the requirements of Australian Standards. The main requirements of Australian Standards are that a rainhead is physically sealed to a box gutter and has provision to overflow outside a building without restriction in up to a 1:100 year rain event. The rainheads 1 of the invention may be sized to be slightly wider than a box gutter (not shown) that it is servicing to act as a cover plate around broken edges of masonry or render where the box gutter penetrates a building.

The actual sizes of the rainheads 1 suitable for the particular application and location of use will be determined based on the flow rate for a given roof area having a design rainfall intensity for a 1:100 year reoccurrence period for a specific location in Australia as defined in 3500.3. These areas may be expressed as areas/regions for ease of selection/appropriate application.

The following equations are utilized to compute the nappe profiles downstream of a box gutter, and downstream of the internal wall 7 respectively.

Figure 7:
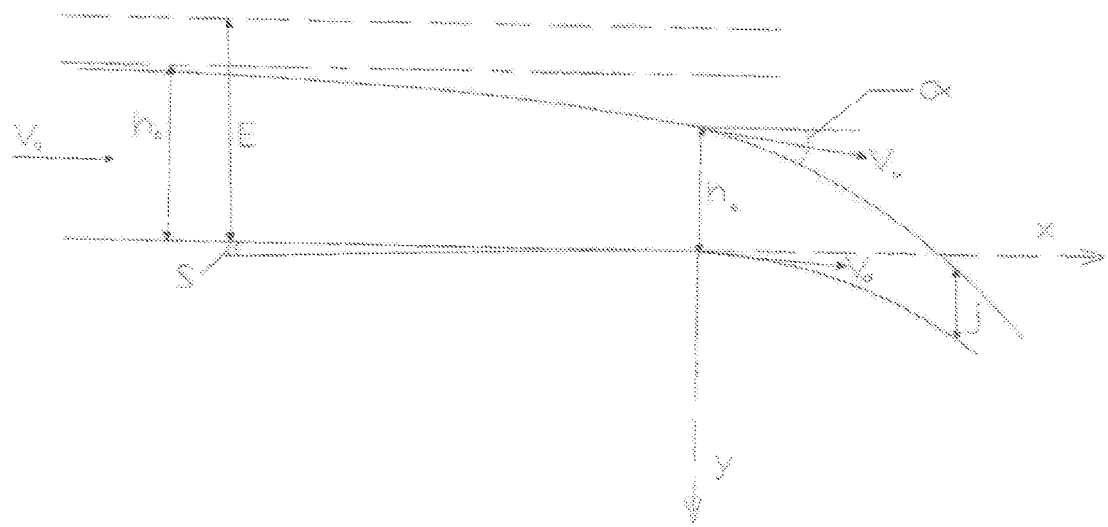
FIG. 7 shows the nappe profiles downstream of a box gutter.

Downstream of the Box Gutter (Free Overfall)—See FIG. 7:

$$Y = \frac{h_e}{h_0} - \frac{V_{uy}}{V_{ux}}X - \frac{gh_0}{2V_{ux}^2}X^2$$

where $$Y = \frac{y}{h_0}$$

$h_e$ is the brink depth
$V_{uy}$ is the vertical velocity component at the brink
$V_{ux}$ is the horizontal velocity component at the brink $$X = \frac{x}{h_0}$$

$h_0$ is the uniform depth in the box gutter
x and y are horizontal and vertical coordinates of the upper nappe respectively.

Figure 8:
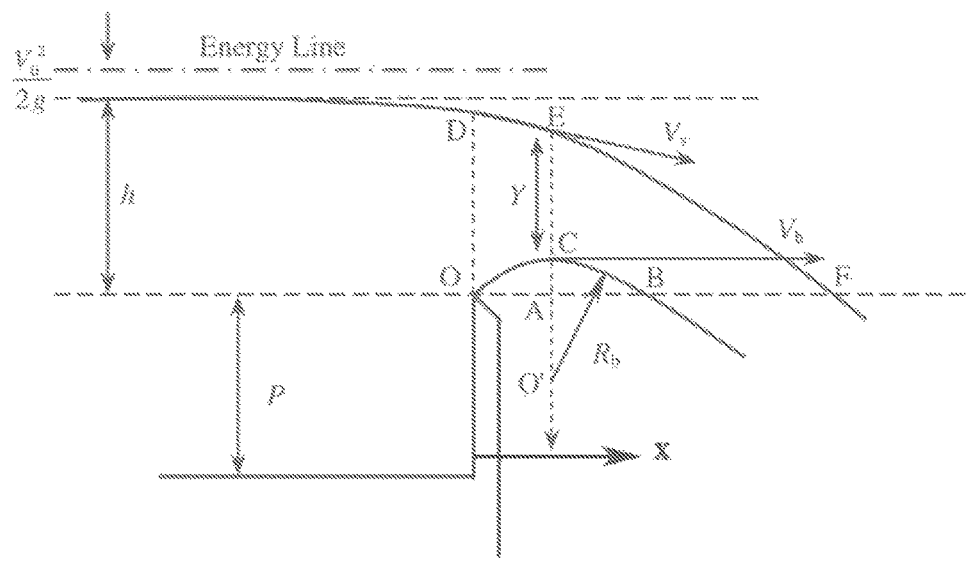
FIG. 8 shows the nappe profiles downstream of the internal wall.

Downstream of the Internal Wall (Sharp-Crested Weir)—See FIG. 8:

$$y = \left(-0.425\left(\frac{x}{H}\right)^2 + 0.055\left(\frac{x}{H}\right) + 0.15 + 0.559\right)H$$

where H is the upstream energy level (equivalent, in this case, to the upstream depth)
x and y are horizontal and vertical coordinates of the upper nappe respectively.

While the above description includes preferred embodiments of the invention, it is to be understood that many variations, alterations, modifications and/or additions may be introduced into the constructions and arrangements of parts previously described without departing from the essential features or the spirit or ambit of the invention.

As the invention may be embodied in several forms without departing from the spirit of the essential characteristics of the invention, it should be understood that the above described embodiments are not to limit the invention unless otherwise specified, but rather should be construed broadly within the spirit and scope of the invention as defined in the attached claims. Various modifications and equivalent arrangements are intended to be included within the spirit and scope of the invention. Therefore, the specific embodiments are to be understood to be illustrative of the many ways in which the principles of the invention may be practiced.

Where the terms "comprise", "comprises", "comprised" or "comprising" are used in this specification, they are to be interpreted as specifying the presence of the stated features, integers, steps or components referred to, but not to preclude the presence or addition of one or more other features, integers, steps, components to be grouped therewith.

The invention claimed is:

1. An overflow device for enabling flow of water from a roof of a structure, along a box gutter of the structure, and into a downpipe, the overflow device comprising:
a tub having a mounting wall, a front wall, two side walls, an internal wall positioned between the two side walls, and a base portion between the mounting wall and the internal wall and between the two sides walls;
a weir formed by an upper edge of the internal wall, the weir and the internal wall dividing an interior of the tub into an internal receptacle above the base portion between the mounting wall and the internal wall and a chute between the front wall and the internal wall;
a gutter receptor forming an inlet into the internal receptacle, the gutter receptor configured for receiving an end of the box gutter;
a chute outlet from the tub, the chute outlet between the front wall and the internal wall; and
a downpipe outlet within the base portion, the downpipe outlet configured for engaging the downpipe;
wherein the overflow device is configured and arranged for mounting to a wall of the structure adjacent the end of the box gutter, the mounting wall facing the wall of the structure, the downpipe outlet engaging with the downpipe, and the end of the box gutter engaging with the gutter receptor; and
wherein the overflow device is configured and arranged for water to flow from the roof of the structure, along the box gutter of the structure, pass through the inlet into the internal receptacle, and discharge through the downpipe outlet into the downpipe or, if either the internal receptacle or downpipe is blocked, the overflow device is configured and arranged for water to fill the internal receptacle, overflow the weir into the chute, and discharge to outside of the structure through the chute outlet.

2. The overflow device according to claim 1, further comprising a moulding disposed around a top of the tub on an external side of the tub.

3. The overflow device according to claim 1, further comprising a moulding disposed around a top of the tub on an internal side of the tub.

4. The overflow device according to claim 1, wherein the two side walls are curved.

5. The overflow device according to claim 1, wherein a top of the internal wall is rounded or has a sharp edge.

6. The overflow device according to claim 1, further comprising a secondary overflow outlet within a wall of the chute.

7. The overflow device according to claim 6, wherein a bottom edge of the secondary overflow outlet is lower than a level of the internal wall.

8. The overflow device according to claim 1, wherein the internal wall is lower than a bottom level of water flowing from the inlet.

9. The overflow device according to claim 1, wherein capacity of the internal receptacle is 5 to 45 times a numerical value of a cross-sectional area of the inlet.

10. The overflow device according to claim 1, wherein capacity of the internal receptacle is 15 to 30 times a numerical value of a cross-sectional area of the inlet.

11. The overflow device according to claim 1, wherein the inlet has a cross-sectional area 2.5 to 4 times a cross-sectional area of the chute outlet.

12. The overflow device according to claim 1, wherein the inlet has a cross-sectional area 1 to 3 times a cross-sectional area of the chute outlet.

13. The overflow device according to claim 6, wherein the secondary overflow outlet has a cross-sectional area 0.1 to 1 times an area of the inlet.

14. The overflow device according to claim 6, wherein the secondary overflow outlet has a cross-sectional area 0.15 to 0.5 times an area of the inlet.

15. The overflow device according to claim 1, further comprising an attachment member configured for mounting the overflow device to the wall of the structure.

16. An overflow device for enabling flow of water from a roof of a structure, along a box gutter of the structure, and into a downpipe, the overflow device comprising:
- a tub having a mounting wall, a front wall, two side walls, an internal wall positioned between the two side walls, and a base portion between the mounting wall and the internal wall and between the two sides walls;
- a weir formed by an upper edge of the internal wall, the weir and the internal wall dividing an interior of the tub into an internal receptacle above the base portion between the mounting wall and the internal wall and a chute between the front wall and the internal wall;
- a gutter receptor forming an inlet into the internal receptacle, the gutter receptor configured for receiving an end of the box gutter;
- a chute outlet from the tub, the chute outlet between the front wall and the internal wall;
- a downpipe outlet within the base portion, the downpipe outlet configured for engaging the downpipe; and
- an attachment member configured for mounting the overflow device to a wall of the structure;
- wherein the overflow device is configured and arranged for mounting to the wall of the structure adjacent the end of the box gutter, the mounting wall facing the wall of the structure, the downpipe outlet engaging with the downpipe, and the end of the box gutter engaging with the gutter receptor; and
- wherein the overflow device is configured and arranged for water to flow from the roof of the structure, along the box gutter of the structure, pass through the inlet into the internal receptacle, and discharge through the downpipe outlet into the downpipe or, if either the internal receptacle or downpipe is blocked, the overflow device is configured and arranged for water to fill the internal receptacle, overflow the weir into the chute, and discharge to outside of the structure through the chute outlet.

17. The overflow device according to claim 16, further comprising a moulding disposed around a top of the tub on an external or an internal side of the tub.

18. The overflow device according to claim 16, wherein a top of the internal wall is rounded or has a sharp edge.

19. The overflow device according to claim 16, wherein the two side walls are curved.

20. The overflow device according to claim 16, further comprising a secondary overflow outlet within a wall of the chute.

* * * * *